United States Patent
Francis, Jr.

(10) Patent No.: US 9,828,647 B2
(45) Date of Patent: Nov. 28, 2017

(54) INDUCTION HARDENING APPARATUS AND METHODS

(71) Applicant: Richard G. Francis, Jr., Rockford, IL (US)

(72) Inventor: Richard G. Francis, Jr., Rockford, IL (US)

(73) Assignee: Golfers Family Corporation, Rockford, IL (US)

( * ) Notice: Subject to any disclaimer, the term of this patent is extended or adjusted under 35 U.S.C. 154(b) by 364 days.

(21) Appl. No.: 14/830,442

(22) Filed: Aug. 19, 2015

(65) Prior Publication Data

US 2015/0354020 A1 Dec. 10, 2015

Related U.S. Application Data

(62) Division of application No. 13/626,954, filed on Sep. 26, 2012, now Pat. No. 9,340,844.

(51) Int. Cl.
| | |
|---|---|
| *H05B 6/10* | (2006.01) |
| *C21D 1/10* | (2006.01) |
| *C21D 1/42* | (2006.01) |
| *C21D 1/62* | (2006.01) |
| *C21D 9/00* | (2006.01) |
| *C21D 9/46* | (2006.01) |

(52) U.S. Cl.
CPC ............... *C21D 1/10* (2013.01); *C21D 1/42* (2013.01); *C21D 1/62* (2013.01); *C21D 9/0062* (2013.01); *C21D 9/46* (2013.01); *C21D 9/0068* (2013.01); *Y02P 10/253* (2015.11)

(58) Field of Classification Search
CPC ... C21D 1/10; C21D 1/18; C21D 1/42; C21D 1/62; C21D 9/0018; C21D 9/0062; C21D 9/0068; C21D 9/30; C21D 9/46; C21D 9/60; Y02P 10/253; H05B 6/06; H05B 6/36; H05B 6/40; H05B 6/44; H05B 6/102; H05B 6/103; H05B 6/104; H05B 6/362
USPC ............... 219/635, 639, 645, 646, 647, 654; 148/131, 143, 144, 150, 153, 574, 575, 148/646, 656; 266/129, 259
See application file for complete search history.

(56) References Cited

U.S. PATENT DOCUMENTS

| | | | | |
|---|---|---|---|---|
| 2,467,201 | A * | 4/1949 | Frazier | H05B 6/40 |
| | | | | 219/646 |
| 3,101,400 | A * | 8/1963 | Gagliardi | C21D 9/60 |
| | | | | 219/635 |
| 4,258,241 | A | 3/1981 | Soworowski | |
| 4,315,124 | A | 2/1982 | Granstrom et al. | |
| 4,673,785 | A | 6/1987 | Damiani | |
| 2011/0073590 | A1 | 3/2011 | Dappen et al. | |
| 2013/0133784 | A1* | 5/2013 | Kristan | C21D 9/04 |
| | | | | 266/259 |

* cited by examiner

*Primary Examiner* — Hung D Nguyen
(74) *Attorney, Agent, or Firm* — Reinhart Boerner Van Deuren P.C.

(57) ABSTRACT

An induction hardening apparatus and methods are provided. The induction hardening apparatus includes a feed line having first and second ends. A coil assembly is positioned between the first and second ends. The feed line includes a support arrangement for supporting two workpieces against one another and transferring the workpieces simultaneously through the coil assembly along a feed axis defined by the feed line.

4 Claims, 6 Drawing Sheets

INDUCTION HARDENING APPARATUS AND METHODS

CROSS-REFERENCE TO RELATED PATENT APPLICATION

This patent application is a Divisional of co-pending U.S. patent application Ser. No. 13/626,954, filed Sep. 26, 2012, the entire teachings and disclosure of which are incorporated herein by reference thereto.

FIELD OF THE INVENTION

This invention generally relates to heat treatment, and more particularly to induction hardening.

BACKGROUND OF THE INVENTION

Induction hardening is a non-contact heat treatment process which utilizes the phenomena of inductive heating to harden all or a portion of a surface layer of a workpiece. During this process, the conductive workpiece is placed into a strong alternating magnetic current, thereby creating electrical currents on the surface of the workpiece. These electrical currents flow predominantly into the surface layer of the workpiece causing this layer to rapidly increase in temperature.

In the context of a steel workpiece, ideally the same is heated until the surface layer is at a temperature that is at or above the transformation range temperature. Thereafter, the workpiece is immediately quenched thereby forming a martensitic structure in the surface layer that is harder than the base material. Generally, the hardened surface layer functions as a protective "skin" for the workpiece, with reduced wear vulnerability. The aforementioned process is used in various applications, including tool tip hardening, pin and shaft hardening, blade edge hardening, etc.

There are generally two principal methods for induction edge hardening. The first is referred to as "single shot" hardening, wherein a workpiece is held statically in the alternating magnetic field so that the entire area that will be heat treated is heated simultaneously. The second method is referred to as "traverse" hardening, wherein the workpiece moves through the alternating magnetic field progressively, so that the area that will be heat treated is incrementally heated as it passes through the field.

In either case, both single shot and traverse edge hardening processes are known to produce substantial deformations in the workpiece. As a result, a post-hardening straightening operation is required to remove the dimensional anomalies that result from these deformations to ensure that the workpiece meets its required dimensional specifications.

Unfortunately, such a post-hardening straightening process is very undesirable. From a cost perspective, this additional process increases the cost of manufacturing per part. From a lead time perspective, this additional process increases the overall processing time from order to delivery. Furthermore, the depth of the surface layer that is hardened must be deep enough to accommodate subsequent material removal during straightening. As such, the heat treated surface layer is often times much deeper than necessary simply to ensure that a sufficient amount of the hardened surface layer will remain. To achieve this overshoot in hardened depth, higher frequency and power requirements are necessary during the induction edge hardening process to generate a sufficient amount of electrical current that will achieve the desired hardened surface layer depth.

Therefore, there is a need in the art for an edge hardening apparatus and method that will substantially reduce or entirely eliminate the need for any post-hardening straightening operations. The invention provides such an apparatus and method. These and other advantages of the invention, as well as additional inventive features, will be apparent from the description of the invention provided herein.

BRIEF SUMMARY OF THE INVENTION

In one aspect, embodiments of the present provide a method for traverse induction hardening. One embodiment of such a method may include aligning a pair of parts such that the parts are in a side-by-side relationship with one another along their entire length such that one part does not extend beyond the other part. The parts are aligned in a pair such that an interior surface of one of the pair of parts is in contact with an interior surface of the other one of the pair of parts. The method further includes loading the aligned pair of parts into a linear track and feeding the aligned pair of parts along a linear track along a feed direction. The method further includes passing the aligned pair of parts through a coil assembly, such that at least a portion of each part of the pair of parts is simultaneously subjected to induction heating. The method also includes simultaneously quenching each one of the pair of parts as they exit the coil assembly.

In certain embodiments, the method also includes aligning subsequent pairs of parts sequentially and in an abutted end-to-end relationship such that each one of the aligned subsequent pairs of parts is aligned in an identical manner to each other one of the aligned subsequent pairs of parts.

In certain embodiments, the step of loading includes sequentially loading each one of the pairs of parts into the linear track. The step of feeding includes sequentially and continuously feeding each one of the aligned pairs of parts along the feed direction. The step of passing includes sequentially and continuously passing each one of the aligned pairs of parts through the coil assembly. The step of simultaneously quenching includes simultaneously quenching each one of each pair of parts sequentially and continuously.

In certain embodiments, the step of loading includes positioning the aligned pair of parts into a channel of the linear track. The channel is defined between two upstanding guides in an opposed space relation. The step of feeding the aligned pair of parts includes gripping the aligned pair of parts between at least one pair of rollers arranged adjacent to the track. The step of feeding may also include gripping the aligned pair of parts between the at least one pair of rollers such that the inter surface of one part is held tightly against the interior surface of the other part. The step of feeding may also include gripping the aligned pair of parts successively by a plurality of pairs of rollers arranged sequentially adjacent to the track. The step of feeding may also include gripping the aligned pair of parts before it enters the coil assembly, and after the aligned pair of parts exits the coil assembly.

In certain embodiments, the step of passing the aligned pair of parts through a coil assembly includes passing an uppermost edge of each one of the pair of parts through the coil assembly simultaneously to edge harden each one of the pair of parts.

The step of quenching may include passing the aligned pair of parts under a quench head which directs a shower of coolant towards the aligned pair of parts. The step of quenching may also include separating the aligned pair of parts such that their respective interior surfaces are no longer in contact as the aligned pair of parts pass under the quench head. In certain embodiments, the method may also include a step of passing the aligned pair of parts down a chute and into a quench bath after passing the pair of parts under the quench head. In another aspect, embodiments of the present invention provide a method for traverse induction hardening. An embodiment of a method according to this aspect includes the steps of sequentially aligning pairs of parts such that for each pair of parts, an interior surface of one part is in contact with an interior surface of the other part. The method also includes sequentially loading each pair of aligned parts into a track such that each one of the aligned pairs of parts are arranged in an abutted end-to-end relationship along the track to form a linear row of aligned pairs of parts. The method also includes continuously feeding the linear row of aligned pairs of parts through a coil assembly such that each pair of parts is sequentially subjected to induction heating. The method also includes separating the two parts of each pair of parts as they exit the coil assembly such that the interior surface of one part of the pair of parts is no longer in contact with the other part of the pair of parts. The method also includes quenching each separated pair of parts in a quenching station positioned adjacent the track such that coolant flows on the interior surface of both parts of the separated pair of parts, as well as an exterior opposed surface of both parts of the pair of parts.

In certain embodiments, the step of sequentially aligning includes aligning each pair of parts such that for each pair, the parts are in a side-by-side relationship and with one another along their entire length.

In certain embodiments, the step of sequentially loading includes loading the pairs of parts into a channel of the track defined between two upright opposed guides which extend generally perpendicular to a base surface.

In certain embodiments, the step of continuously feeding includes feeding the linear row of pairs of parts through a plurality of sequentially arranged rollers which are arranged in spaced-apart pairs.

In yet another aspect, embodiments of the present invention provide an induction hardening apparatus. The apparatus according to this aspect includes a track including a base surface and a pair of opposed guides extending upwardly from the base surface to define a channel. A coil assembly for edge hardening parts via induction heating is also provided. The coil assembly is positioned adjacent and above the track. The coil assembly is spaced from the track such that a portion of each one of a pair of side-by-side parts may simultaneously pass through the coil assembly. The apparatus also includes a feed arrangement configured for feeding a linear row of pairs of side-by-side parts along the track in a feed direction through the coil assembly. The apparatus also includes a quenching station downstream from the coil assembly relative to the feed direction. The quenching station is positioned adjacent to and above the track and operable to quench the linear row of pairs of side-by-side parts as they sequentially exit the coil assembly.

In certain embodiments, the opposed guides are spaced apart a first distance upstream of the coil assembly and spaced apart a second distance downstream of the coil assembly. The second distance is greater than the first distance. The feed arrangement may also include a plurality of rollers arranged sequentially in pairs such that the track is interposed between the rollers of each pair of rollers. The spacing of the quenching station from an exit of the coil assembly may be adjustable to govern a delay of time from part heat-up to part quenching at the quenching station.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
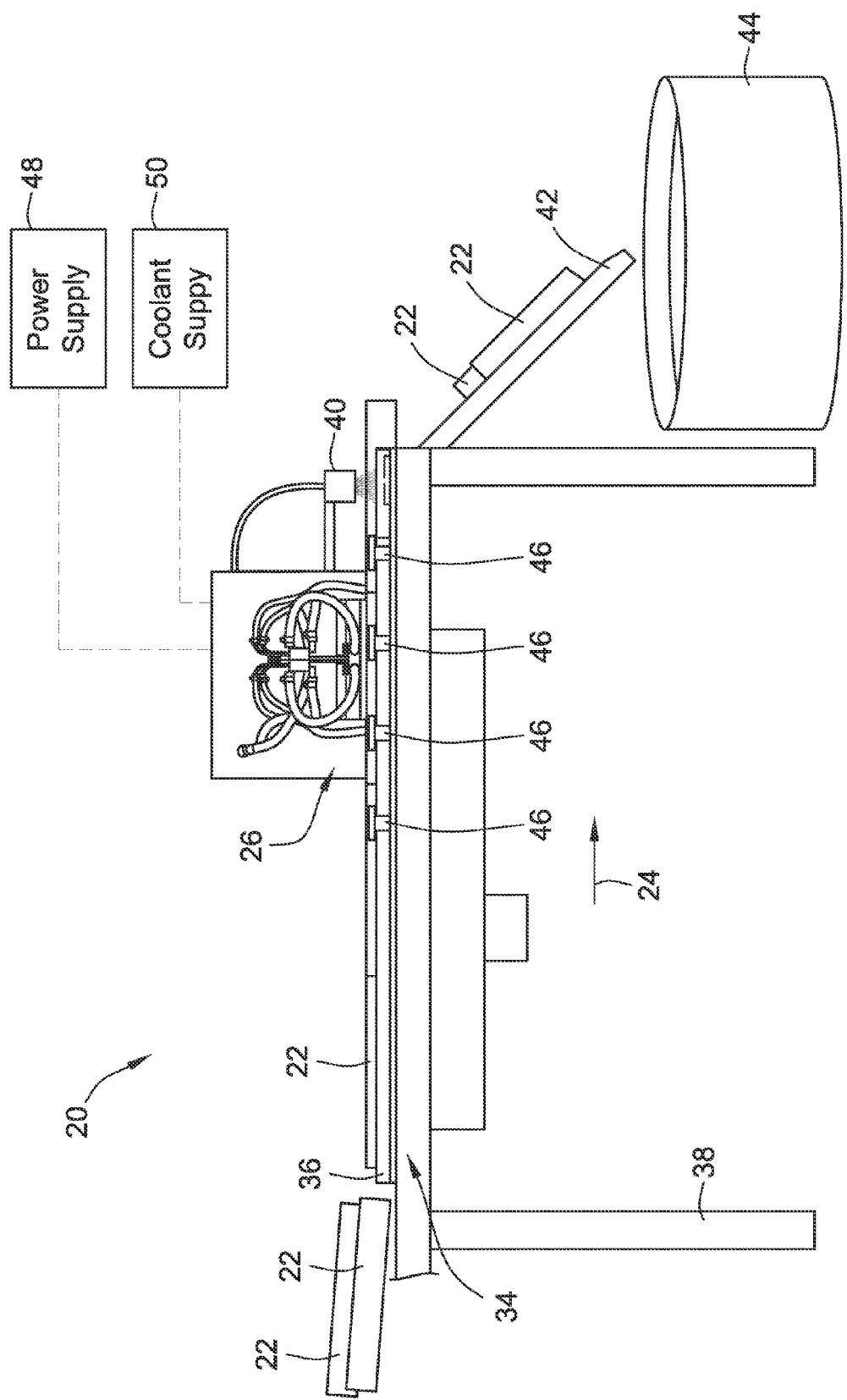
FIG. 1 is a side view of one embodiment of an induction hardening apparatus according to the teachings of the present invention.

Turning now to FIG. 1, an exemplary embodiment of an induction hardening apparatus 20 is illustrated. As will be explained in greater detail below, induction hardening apparatus 20 advantageously reduces or entirely eliminates the additional straightening step otherwise required by conventional transverse induction hardening apparatuses. Indeed, induction hardening apparatus 20 is operable to edge harden parts 22 such that under typical dimensional specifications, no additional straightening step is required. Put differently, induction hardening apparatus 20 substantially reduces or entirely eliminates part deformations otherwise present after conventional induction edge hardening.

Induction hardening apparatus 20 feeds parts 22 along feed direction 24 such that they pass through a coil assembly 26. While passing through coil assembly 26 parts 22 are edge hardened under the phenomena of induction edge hardening. Parts 22 are arranged in a side-by-side relationship such that two parts 22 simultaneously pass through coil assembly 26. Further, pairs of parts 22 are arranged end-to-end as illustrated so that any given side-by-side pair of parts 22 begin and end the edge hardening process at the same time. Put differently, parts 22 are arranged in identical pairs consisting of two side-by-side parts, with successive pairs arranged in an end-to-end relationship such that a leading edge of each one of a pair of parts 22 enters coil assembly 26 at the same time, while a trailing edge of each of the parts 22 leaves coil assembly 26 at the same time.

To facilitate such an arrangement, induction hardening apparatus 20 includes a track 34 for feeding pairs of parts 22 along feed direction 24. Track 34 includes a pair of opposed guides 36 which support parts 22 in a generally upright position. Track 34 is supported by a base stand 38. A feed arrangement in the form of a plurality of feed rollers 46 are disposed on either side of coil assembly 26 and are operable to feed the aforementioned pairs of parts 22 through coil assembly 26. Once through coil assembly 26, feed rollers 46 are also operable to feed pairs of parts 22 along feed direction 24 such that parts 22 pass underneath a quench station 40 which exposes the heated parts 22 to a coolant quench. After passing through quench station 40, parts 22 fall along a chute 42 and into a quench bath 44.

Induction hardening apparatus 20 is illustrated as schematically connected to a power supply 48 for providing the required electrical power for coil assembly 26, rollers 46, and other various sensors of induction hardening apparatus 20. It will be recognized that the particular characteristics of power supply 48 will vary depending upon application, however one exemplary embodiment of a power supply 48 can be an incoming electrical supply of 480 volt three phase electric power at 60 Hz.

Induction hardening apparatus 20 is also illustrated as schematically connected to a coolant supply 50. Coolant supply 50 is operable to provide the quenching coolant to quench station 40, as well as replenish quench bath 44 as needed. Coolant supply 50 includes means for circulating coolant throughout induction hardening apparatus 20. The coolant utilized may be organic or inorganic, and/or oil or water based.

Figure 2:
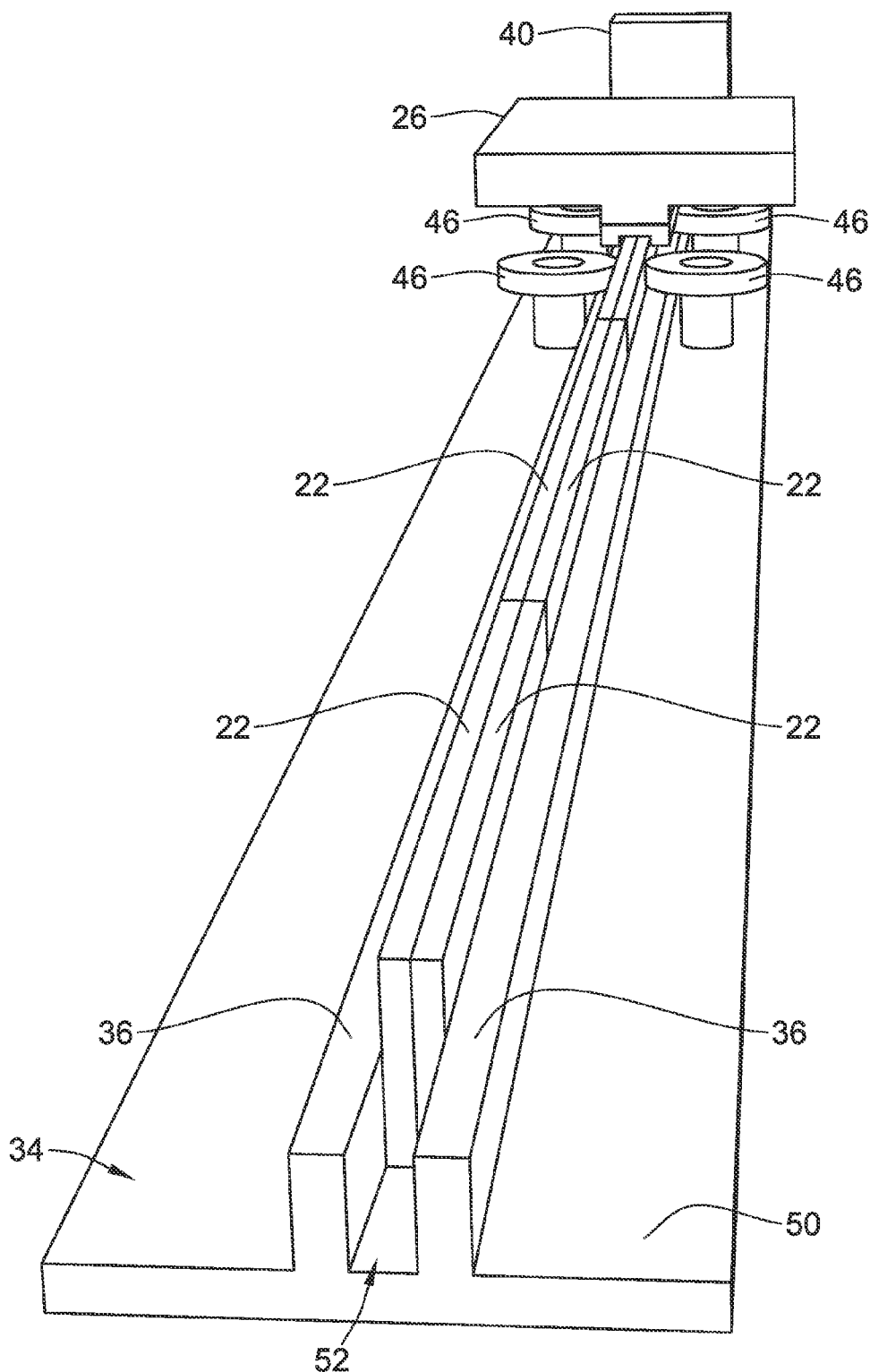
FIG. 2 is a partial perspective view of a track of the induction hardening apparatus of FIG. 1.

Turning now to FIG. 2, a perspective view of track 34 is illustrated. As illustrated, guides 36 depend upwardly from a base surface 50 of track 34 and are generally perpendicular relative thereto. Guides 36 are arranged in an opposed space relationship such that a channel 52 is formed therebetween. Feed rollers 46 are disposed adjacent guides 36 and function in two respects.

First, feed rollers 46 feed adjacent parts 22 along feed direction 24 (See FIG. 1) so that the parts 22 simultaneously pass through coil assembly 26 at an exemplary rate of about 30 ft./min. to about 60 ft./min. Second, feed rollers 46 maintain tight contact between adjacent ones of a pair of parts 22 so that good surface contact is maintained on the interior sides of each part 22 of the pair of parts 22. As illustrated, feed rollers 46 are disposed on either side of parts 22. Feed rollers 46 may be identical to one another, or alternatively, the feed rollers 46 on one side of the pair of parts 22 may be of a greater or lesser hardness than the feed rollers 46 on the other side of the pair of parts 22. Further, belts, conveyors, etc. may be used in place of or in addition to feed rollers 46 to feed the linear row of pairs of parts 22 along feed direction 24. Yet further, feed rollers 46 on one side of coil assembly 26 may be the same as, or a different size than feed rollers 46 on the other side of coil assembly 26. For example, feed rollers 46 upstream from coil assembly 26 may have a smaller diameter than feed rollers 46 downstream from coil assembly 26.

Figure 3:
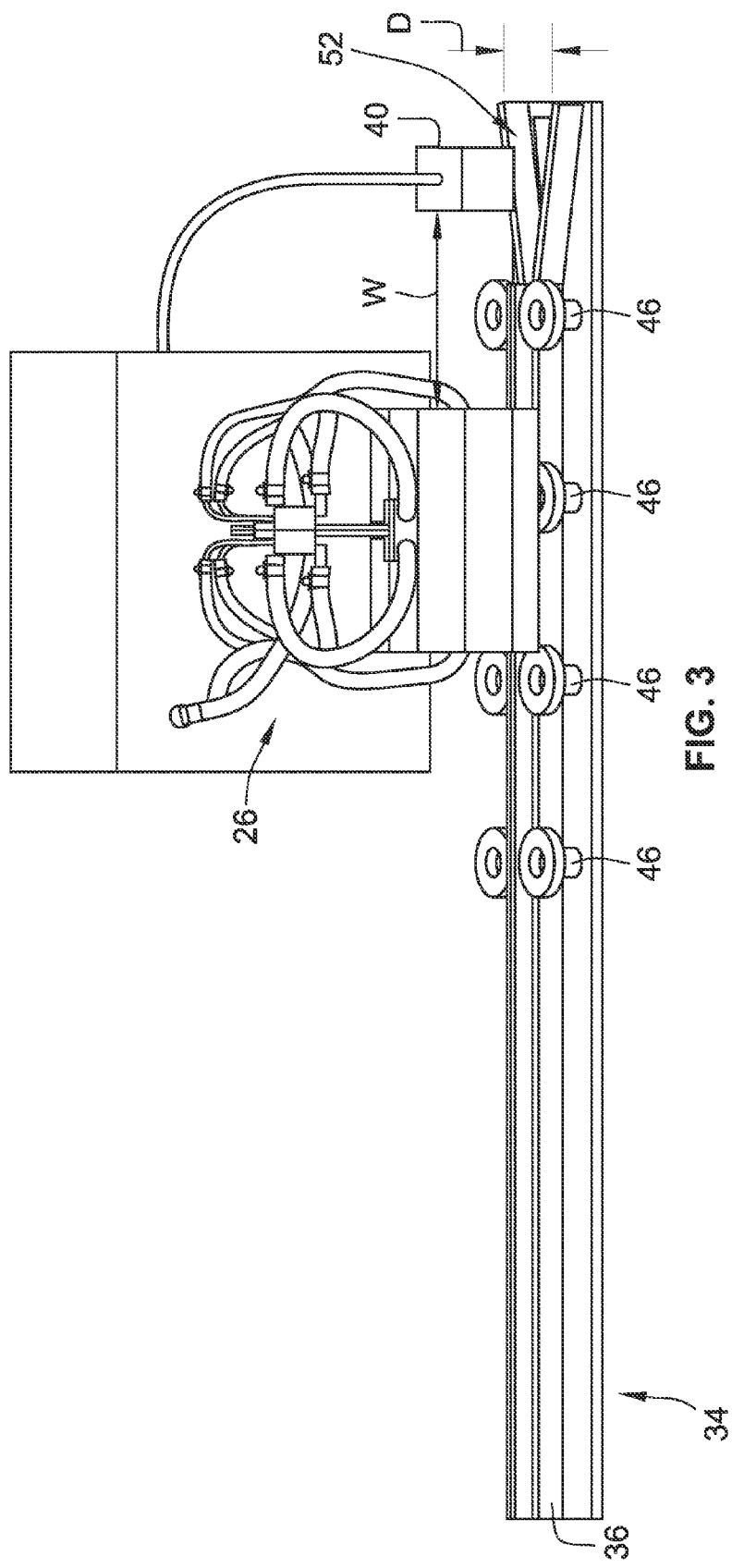
FIG. 3 is a side perspective view of a coil assembly of the induction hardening apparatus of FIG. 1.

Turning now to FIG. 3, quench station 40 is disposed a predetermined distance W from the exit of coil assembly 26. The predetermined distance W may be varied to allow for greater or lesser "soak" times, i.e. the amount of time that the parts remain at an elevated temperature prior to rapid cooling at quench station 40. Furthermore, the size of channel 52 increases to a distance D as illustrated adjacent quench station 40 to allow for a finished pair of parts 22 to separate so that coolant from quench station 40 will pass on both the exterior and interior sides of each part 22 of the pair of parts 22. Such an arrangement insures that each one of the pair of parts 22 is properly quenched and the desired hardness is achieved on all intended surfaces.

Figure 4:
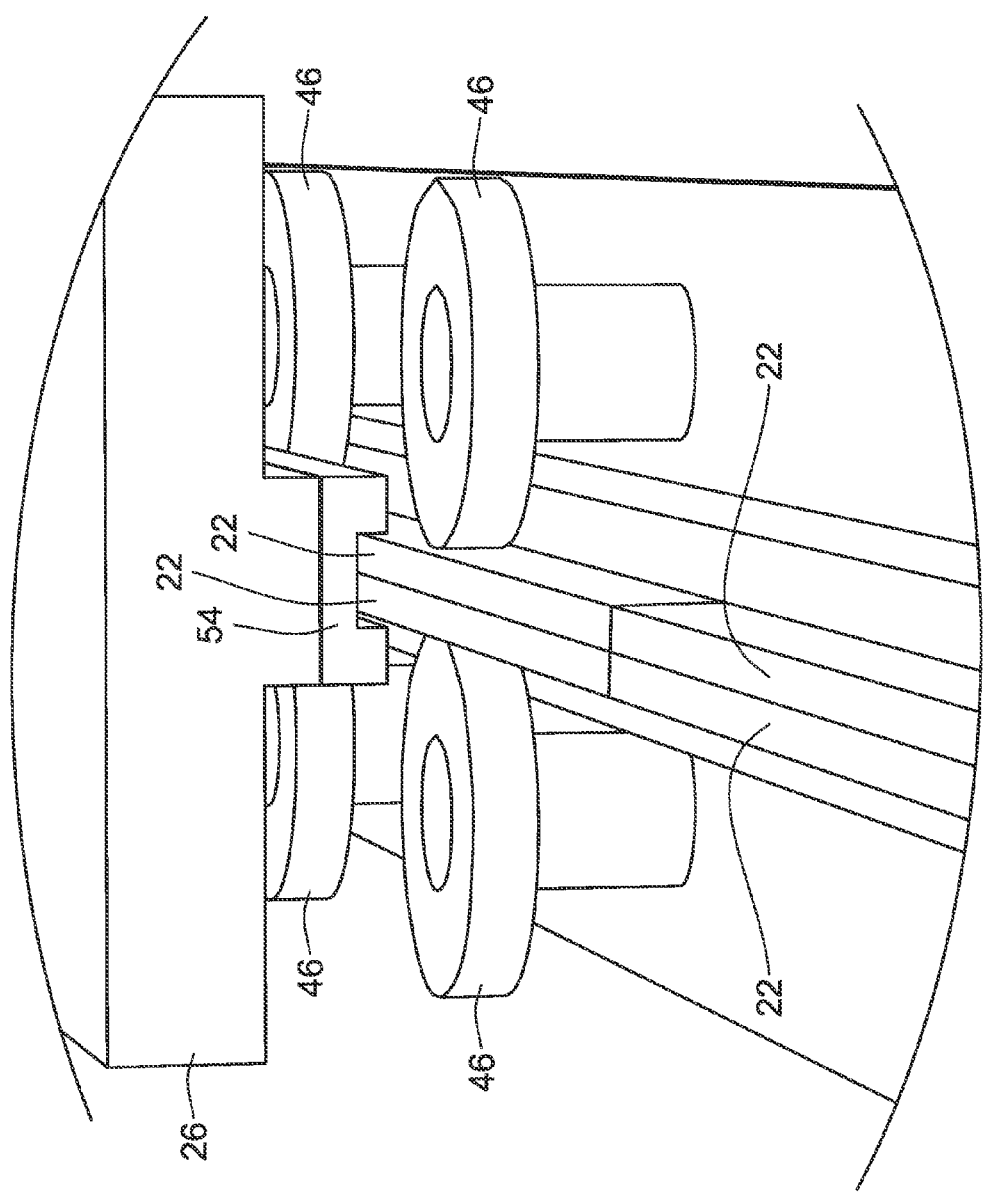
FIG. 4 is a partial perspective view of the coil assembly of FIG. 3.

Turning now to FIG. 4, as stated above, each one of a pair of parts 22 enter coil assembly 26 at the same time. Parts 22 are fed by feed rollers 46 through a coil 54 of coil assembly 26. As illustrated, only a portion of parts 22 are exposed to coil 54 such that only a portion of the overall height of each upright part 22 is rapidly elevated in temperature by way of induction heating. In an exemplary embodiment, the temperature of parts 22 is elevated from ambient to about 1700° F. Those skilled in the art will recognize that this configuration is an edge hardening application.

Figure 5:
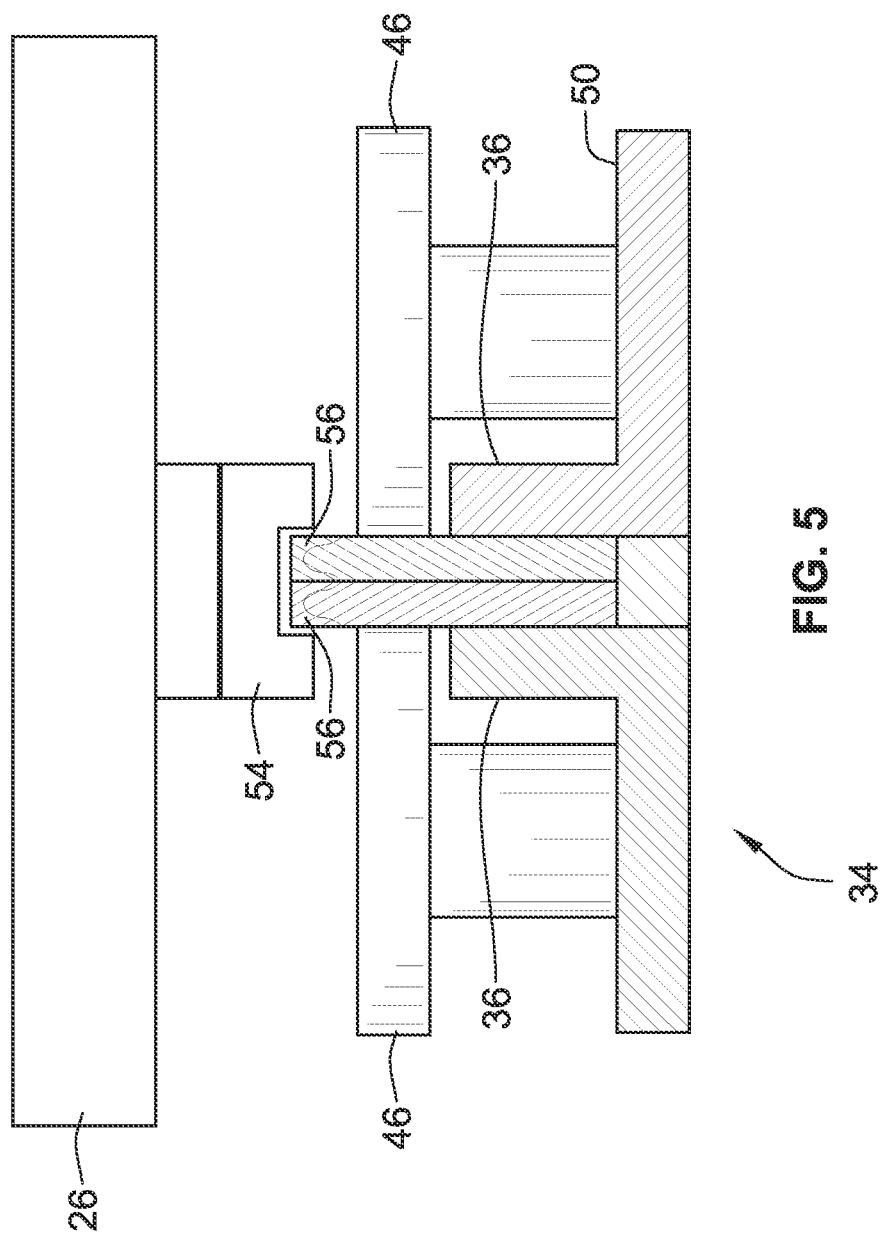
FIG. 5 is a partial front cross section of parts exiting the coil assembly of FIG. 3.

Turning now to FIG. 5, the portions of each part 22 which are elevated in temperature are generally shown at regions 56. It will be recognized that regions 56 are simply a schematic representation that generally illustrate the heated area of each part 22 under typical specifications and operation, parts 22 are hardened to an exemplary case depth of about 0.100" to about 0.125", and about 45 minimum RL. As indicated previously, and illustrated throughout the various figures herein, parts 22 are held tightly together in a side-by-side relationship as illustrated in FIG. 5. This side-by-side relationship allows for each part 22 to support the other part 22 such that deformations along the thickness of parts 22 are substantially reduced or entirely eliminated. Furthermore, because each pair of parts 22 is positioned end-to-end along track 34 (See FIG. 1), the energy imparted to each part 22 as it passes through coil assembly 26 may propagate to the other parts 22 in sequential contact with the pair of parts 22 currently positioned in coil assembly 26. This alternative path of energy dissipation allows for a substantial reduction if not an elimination of part 22 deformation.

Figure 6:
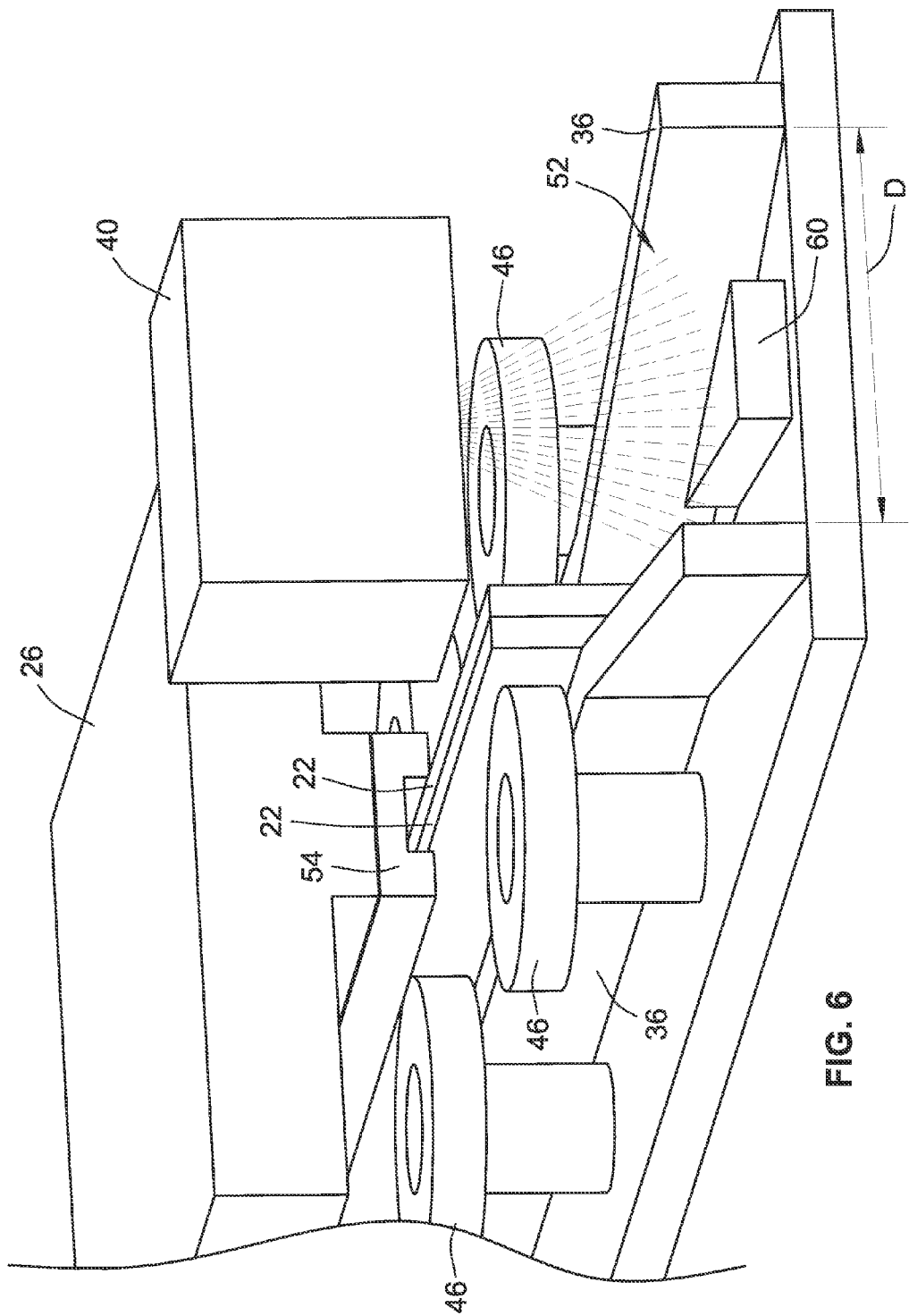
FIG. 6 is a partial perspective view of a quenching station of the induction hardening apparatus of FIG. 1.

Turning now to FIG. 6, quench station 40 is shown in greater detail. As indicated above, guides 36 in the region of quench station 40 are spaced apart at a distance D which is generally greater than the spacing of guides 36 prior to encountering quench station 40. This allows parts 22 to separate as they pass under quench station 40 to insure that coolant passes over the interior and exterior sides of each part 22. Such a result may be achieved by angling guides 36 in the region of quench station 40 as illustrated, or simply providing a separate set of guides 36 which are spaced apart at distance D. Further, a dividing feature 60 may be provided within channel 52 to aid in separating each pair of parts 22 as they pass under quench station 40.

Having described the structural attributes of edge hardening apparatus 20, a description will now be provided of the methods of operating the same. Referring back to FIG. 1, a pair of similar parts 22 are arranged such that their leading and trailing edges are adjacent one another. The pair of parts 22 are then positioned approximate the left most roller 46 in FIG. 1. Thereafter, other pairs of parts 22 are sequentially arranged behind the leading pair of parts 22. The induction hardening apparatus 20 is then powered on allowing feed rollers 46 to pull the first pair of parts 22 along feed direction 24. Simultaneously as this occurs, an operator continues to feed pairs of parts 22 into track 34 at the left most end thereof by pushing the pair of parts into contact with the sequentially arranged pairs of parts 22 positioned on track 34. This pushing by the operator insures that each of the pairs of parts 22 maintain an end-to-end contact with one another as they pass through coil assembly 26.

Each pair of parts 22 then sequentially passes through coil assembly 26 and is heated to a desired heat treating temperature. Upon exiting coil assembly 26 each pair of parts 22 is then exposed to a soak process, i.e. where the pairs of parts 22 continue to travel along feed direction 24 in the ambient air after exiting coil assembly 26. These pairs of parts 22 are at an elevated temperature until they reach quench station 40 and are quenched. As the parts enter quench station 40, the parts are allowed to break the surface contact previously maintained between the interior surfaces of each of the pair of parts 22 to allow coolant to flow over the exterior and interior surfaces of each part 22. After passing through the quench station 40, the parts 22 travel along chute 42 and are introduced to a quench bath 44. After resting in the quench bath 44, parts 22 may be removed and are ready for storage and/or shipment.

As described herein, the induction hardening apparatus 20 advantageously provides a system and method which substantially reduces or eliminates entirely the need to conduct a post-hardening straightening operation which is otherwise required by conventional induction hardening apparatuses. It has been observed that by the elimination of the aforementioned step part output per day has increased from a typical 2,000 parts per day to 6,000 parts per day. As will be readily appreciated, such a tripling of part output has led to significant reduction in part lead time. Further, the cost of manufacture of each part is substantially reduced given the elimination of the aforementioned post-hardening straightening step.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An induction hardening apparatus, the apparatus comprising:
   a track including a base surface and a pair of opposed guides extending upwardly from the base surface to define a channel;
   a coil assembly for edge hardening parts via induction heating, the coil assembly positioned adjacent and above the track, the coil assembly spaced from the track such that a portion of each one of a pair of side-by-side parts may simultaneously pass through the coil assembly;
   a feed arrangement configured for feeding a linear row of pairs of side-by-side parts along the track in a feed direction through the coil assembly; and
   a quenching station downstream from the coil assembly relative to the feed direction, the quenching station positioned adjacent to and above the track and operable to quench the linear row of pairs of side-by-side parts as they sequentially exit the coil assembly.

2. The apparatus of claim 1, wherein the opposed guides are spaced apart a first distance upstream of the coil assembly and spaced apart a second distance downstream of the coil assembly, the second distance greater than the first distance.

3. The apparatus of claim 2, wherein the feed arrangement includes a plurality of rollers arranged sequentially in pairs such that the track is interposed between the rollers of each pair of rollers.

4. The apparatus of claim 3, wherein the spacing of the quenching station from an exit of the coil assembly is adjustable to govern a delay of time from part heat up to part quenching at the quenching station.

* * * * *